(12) United States Patent
Koch et al.

(10) Patent No.: US 6,604,774 B2
(45) Date of Patent: Aug. 12, 2003

(54) COVER DEVICE FOR A FOLDING TOP COMPARTMENT

(75) Inventors: Michael Koch, Sindelfingen (DE); Juergen Schrader, Weil im Schoenbuch (DE)

(73) Assignee: DaimlerChysler AG, Stuttgart (DE)

( * ) Notice: Subject to any disclaimer, the term of this patent is extended or adjusted under 35 U.S.C. 154(b) by 0 days.

(21) Appl. No.: 10/193,668

(22) Filed: Jul. 12, 2002

(65) Prior Publication Data

US 2003/0020296 A1 Jan. 30, 2003

(30) Foreign Application Priority Data

Jul. 14, 2001 (DE) .......................... 101 34 369

(51) Int. Cl.[7] .................................................. B60J 7/00
(52) U.S. Cl. ............................ 296/107.08; 296/107.07; 296/107.17
(58) Field of Search ................ 296/107.08, 107.17, 296/107.07, 224, 221, 219, 210, 147

(56) References Cited

U.S. PATENT DOCUMENTS

| | | | | | |
|---|---|---|---|---|---|
| 2,046,574 A | * | 7/1936 | Olivier | ................... | 296/107.08 |
| 2,181,869 A | * | 12/1939 | Carr | ....................... | 296/107.08 |
| 2,782,070 A | * | 2/1957 | Chaban | ................. | 296/107.08 |
| 3,180,677 A | * | 4/1965 | Scott | ..................... | 296/107.08 |
| 4,778,215 A | * | 10/1988 | Ramaciotti | ............ | 296/107.07 |
| 5,033,789 A | * | 7/1991 | Hayashi et al. | ........ | 296/107.08 |
| 5,295,722 A | * | 3/1994 | Bonne et al. | .......... | 296/107.08 |
| 5,769,483 A | * | 6/1998 | Danzl et al. | ........... | 296/107.08 |
| 6,019,416 A | * | 2/2000 | Beierl | ................... | 296/107.08 |
| 6,030,023 A | | 2/2000 | Guillez | | |
| 6,039,382 A | * | 3/2000 | Mather et al. | ......... | 296/107.08 |
| 6,145,915 A | | 11/2000 | Queveau et al. | | |
| 6,149,221 A | * | 11/2000 | Mentink | ................. | 296/107.08 |
| 6,250,707 B1 | * | 6/2001 | Dintner et al. | ......... | 296/107.08 |
| 6,315,349 B1 | * | 11/2001 | Kinnanen | .............. | 296/107.17 |
| 6,425,621 B2 | * | 7/2002 | Miklosi et al. | ......... | 296/107.08 |
| 2001/0024050 A1 | * | 9/2001 | Schutt et al. | .......... | 296/107.08 |
| 2002/0003355 A1 | * | 1/2002 | Mac Farland | .......... | 296/107.08 |
| 2002/0030381 A1 | * | 3/2002 | Schutt et al. | .......... | 296/107.08 |
| 2003/0020297 A1 | * | 1/2003 | Koch | .................... | 296/107.08 |
| 2003/0020298 A1 | * | 1/2003 | Koch | .................... | 296/107.08 |
| 2003/0047961 A1 | * | 3/2003 | Nania | .................... | 296/107.08 |
| 2003/0052508 A1 | * | 3/2003 | Obendiek | .............. | 296/107.08 |

FOREIGN PATENT DOCUMENTS

| | | |
|---|---|---|
| DE | 4445941 | 3/1996 |
| DE | 4446483 | 6/1996 |
| DE | 29623200 | 1/1998 |
| DE | 29812165 | 6/1999 |
| DE | 10051615 | 5/2001 |
| EP | 1136295 | 9/2001 |

* cited by examiner

*Primary Examiner*—Kiran Patel
(74) *Attorney, Agent, or Firm*—Crowell & Moring LLP

(57) ABSTRACT

A cover device for a folding top compartment of a vehicle with a lowerable roof structure. It being possible to pivot the roof structure into the folding top compartment which is arranged behind a rear region in a back part of the vehicle bodywork and which can be closed with a folding top compartment lid. A cover unit closes, with a front cover part and a rear cover part, a free space which is formed between the closed folding top compartment lid and the rear region. The rear cover part is mounted in a pivotably adjustable fashion on the front cover part, and can be adjusted between an active position, in which the rear cover part closes a gap between the front cover part and the folding top compartment lid, and a passive position, in which the rear cover part clears the gap.

20 Claims, 5 Drawing Sheets

COVER DEVICE FOR A FOLDING TOP COMPARTMENT

This application claims the priority of German Patent Document No. 101 34 369.8, filed Jul. 14, 2001, the disclosure of which is expressly incorporated by reference herein.

BACKGROUND AND SUMMARY OF THE INVENTION

The present invention relates to a cover device for a folding top compartment of a vehicle with a lowerable roof structure, in particular for a hardtop vehicle.

German Patent Document No. DE 44 46 483 C2 discloses such a cover device for a hardtop vehicle in which the roof structure has a front roof part and a rear window part connected thereto. The roof structure can be pivoted, by means of a positive control device supported on the bodywork, into the folding top compartment arranged behind a rear region in a back part of the vehicle bodywork. This folding top compartment can be closed with a folding top compartment lid, which can be folded up towards the rear. In the process, a free space, which can be closed by means of a cover unit, is formed between a front edge region of the closed folding top compartment lid and a rear edge region of the rear region. This cover unit has a front cover part, a central cover part and a rear cover part, as well as two lateral cover parts, these cover parts forming, in a closed position of the cover unit with the roof structure lowered, an essentially planar uninterrupted cover of the free space, which cover adjoins in a flush fashion the rear region and the closed folding top compartment lid.

In the known cover device, a folding device is provided with which the rear cover part and the central cover part can be moved into an approximately vertically positioned securing position in which their undersides bear against one another. In this folded position, the central cover part and the rear cover part adjoin a rear edge region of the front cover part. It is necessary to be able to fold the cover part in order to clear the adjustment path necessary for the pivoting of the roof structure. All the cover parts can also be adjusted together in the longitudinal direction of the vehicle in the manner of a carriage. It is necessary to be able to adjust in the longitudinal direction of the vehicle so that, when the roof structure is lowered, it is possible to cover a gap which is only formed when the roof structure is lowered directly in front of the front edge region of the folding top compartment lid and which is closed off by a lower edge region of the rear window part when the roof structure is closed. Accordingly, the cover unit of the known cover device has a front closed position which is assigned to the closed roof structure and in which the cover parts are displaced forwards and clear the gap for the roof structure, as well as a rear closed position which is assigned to the lowered roof structure and in which the cover parts which are displaced rearwards close the gap. Overall, the implementation of the different adjustment possibilities is relatively complex with the known cover device.

The present invention is concerned with the problem of specifying, for a cover device of the type mentioned at the beginning, an advantageous embodiment which has a relatively economical design.

The mounting of the rear cover part on the front cover part according to the present invention and the adjustment kinematics which are provided for the adjustment of the rear cover part simplify the measures provided for adjusting the cover parts, e.g., for an actuator drive. In particular, it is not necessary to adjust the individual cover parts in the longitudinal direction of the vehicle in order to clear or close up the gap for the roof structure between the rear region and the folding top compartment lid. This is achieved in that the dimensioning of the rear cover part is selected precisely in such a way that when the rear cover part is folded away the front cover part comes to bear essentially flush against the inside of the lower edge region of the closed roof structure in order to close off the free space.

In one advantageous development, the rear cover part can be mounted on the front cover part in such a way that it can be folded away onto the underside of the front cover part in order to take up its passive position. In this embodiment, when the roof structure is closed the rear cover part which is not required is located outside the interior of the vehicle, as a result of which, on the one hand, more interior space is made available in the vehicle in the region of the parcel shelf formed by the front cover part, and, on the other hand, the overall visual impression thus given has a higher aesthetic value.

In one preferred development, a lever arrangement can be attached to the front cover part in order to adjust the rear cover part, the lever arrangement converting the linear adjustments at the input end into pivoting adjustments of the rear cover part. Linear adjusting movements can be transmitted particularly easily from an external drive to the lever arrangement so that the drive which is necessary for the adjusting movement of the rear cover part can be accommodated with comparatively little expenditure outside the front cover part at a suitable location on the vehicle.

Further important features and advantages of the invention emerge from the claims, from the drawings and from the associated description of the figures with reference to the drawings.

It goes without saying that the features which are mentioned above and are still to be explained below can be used not only in the respectively specified combination but also in other combinations or in isolation without departing from the scope of the present invention.

Other objects, advantages and novel features of the present invention will become apparent from the following detailed description of the invention when considered in conjunction with the accompanying drawings.

One preferred exemplary embodiment of the invention is illustrated in the drawings and will be explained in more detail in the following description.

BRIEF DESCRIPTION OF THE DRAWINGS

In the drawings, which are each schematic.

DETAILED DESCRIPTION OF THE DRAWINGS

Figure 1:
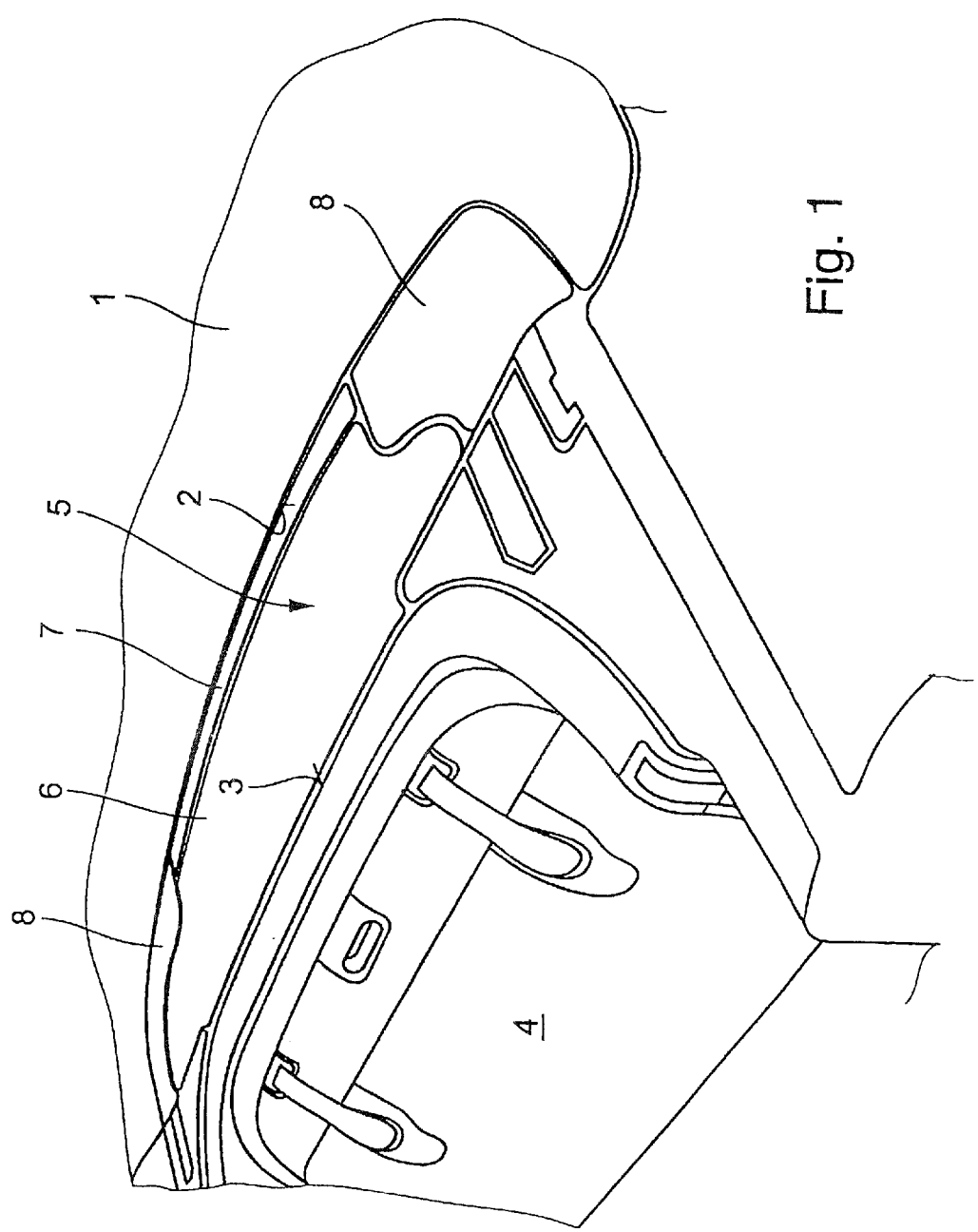
FIG. 1 shows a perspective view of a back part of a passenger car equipped with a cover device according to the invention with the roof structure lowered.

FIG. 1 shows a rear view of a passenger car (otherwise not illustrated) which has a lowerable roof structure so that the vehicle is what is referred to as a convertible. The roof structure is preferably what is referred to as a hardtop, that is to say a roof structure with shell elements made of metal or plastic. Likewise, a roof structure as a soft top, in which the lowerable roof is essentially comprised of a fabric material, is also possible. At the back of the vehicle, a folding top compartment is formed for accommodating the lowered roof structure. This folding top compartment can be closed with a folding top compartment lid 1, which is mounted on the vehicle bodywork so that it can fold up towards the rear in order to open the folding top compartment. If, next to or below the space for accommodating the roof structure, the folding top compartment contains an additional storage space, referred to as a boot, the folding top compartment lid 1 can also be embodied so that it can fold up forwards in order to open this boot.

Figure 3:
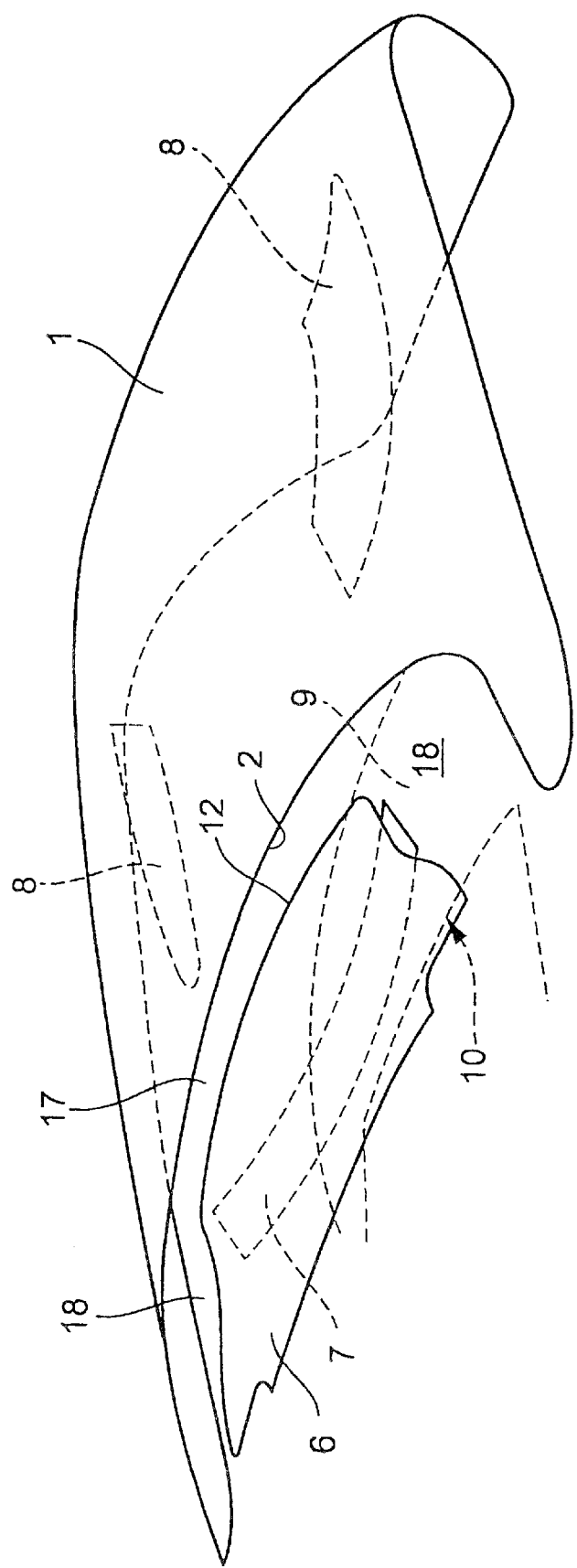
FIG. 3 shows a view as in FIG. 2 but with the roof structure closed, the roof structure being however only partially shown.

When the folding top compartment lid 1 is closed, a free space remains between a front edge region 2 of the folding top compartment lid 1 and a rear edge region 3 of a rear region 4 of the vehicle. This free space is closed in FIG. 1 by a cover unit 5, which has a front cover part 6, a rear cover part 7 and two lateral cover parts 8. When the roof structure is lowered, the free space between the folding top compartment lid 1 and rear region 4 is closed essentially without gaps by the four cover parts 6, 7, 8 of the cover unit 5, the cover parts 6, 7, 8 adjoining, approximately flush, the outer contour of the folding top compartment lid 1 and of the rear edge region 3 of the rear region 4. When the roof structure is closed, the rear cover part 7 and the lateral cover parts 8 are folded away, a gap 17, as shown in FIG. 3, which is cleared by the folded-away, rear cover part 7 being penetrated by a rear and lower edge region of the extended roof structure, while the folded away, lateral cover parts 8 each clear a passage opening 18, as shown in FIG. 3, for a C pillar, designated by 9 in FIG. 3, of the closed roof structure, designated by 10 in FIG. 3. The front cover part 6 forms a parcel shelf in the interior of the vehicle in the closed position when the roof structure is closed.

Figure 4:
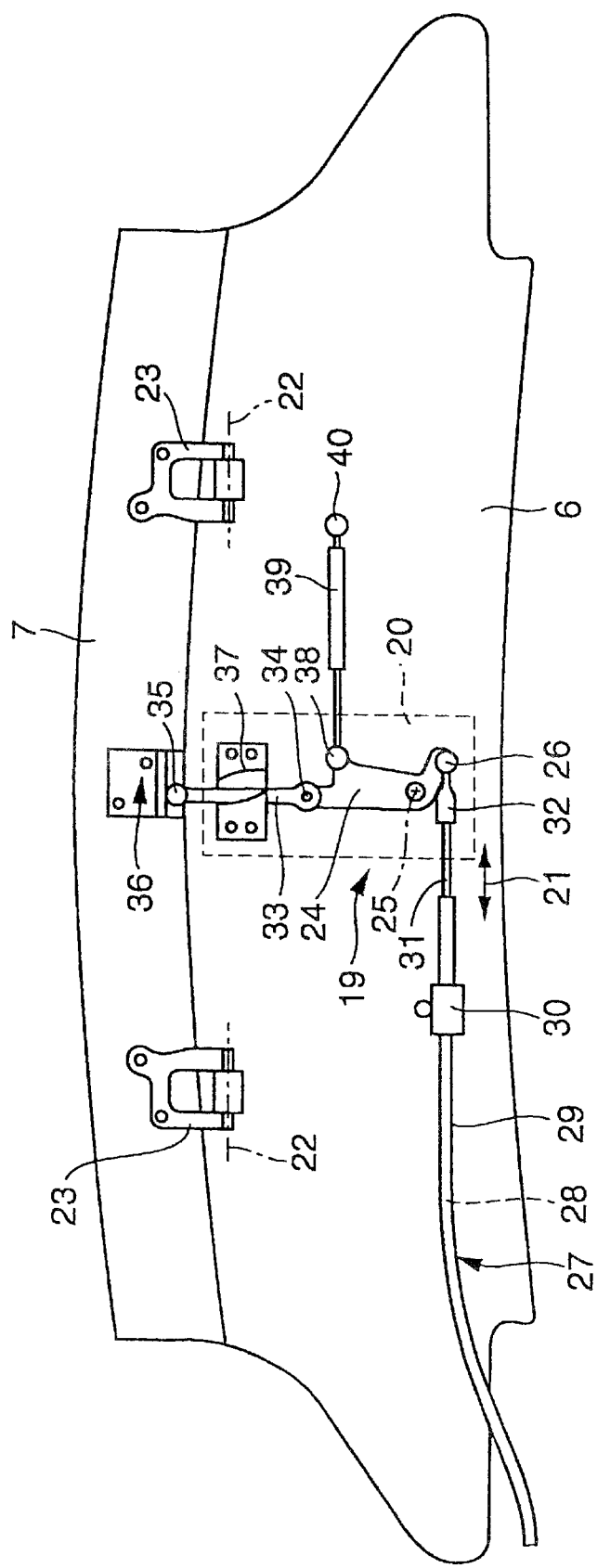
FIG. 4 shows a view from below of a front cover part with a rear cover part mounted on it with the rear cover part adjusted into its active position.
Figure 5:
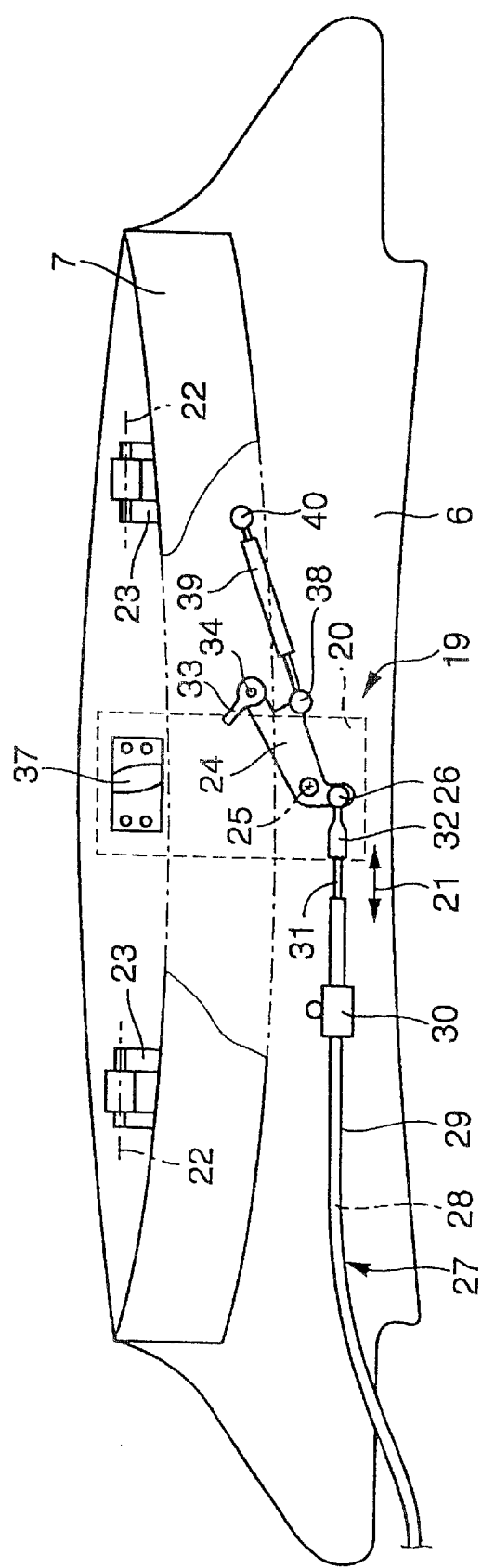
FIG. 5 shows a view as in FIG. 4, but with the rear cover part adjusted into its passive position.

The front cover part 6 is mounted so as to be capable of pivoting on the vehicle bodywork, while the rear cover part 7 is mounted so as to be capable of pivoting on the front cover part 6. The lateral cover parts 8 are mounted so as to be capable of pivoting on the folding top compartment lid 1. The mounting of the individual cover parts 6, 7, 8 according to the invention permits specific adjustment kinematics to be achieved, which will be explained in particular in more detail with reference to FIGS. 2 to 5, only the cover parts 6, 7, 8 of the cover unit 5 and the folding top compartment lid 1 being then illustrated in FIGS. 2 and 3, while FIGS. 4 and 5 give more details on the adjustment mechanism of the rear cover part 7.

Figure 2:
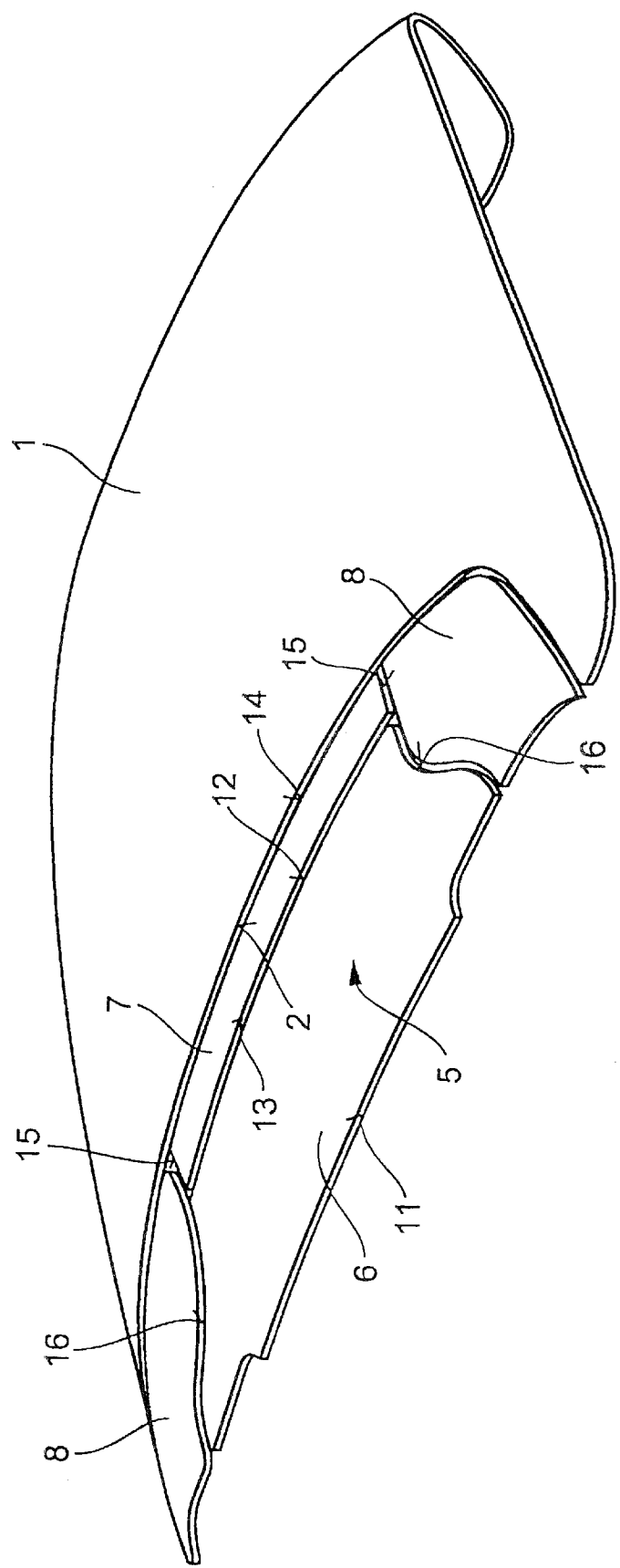
FIG. 2 shows a perspective view of a cover unit of the cover device according to the invention and of a folding top compartment lid of the motor vehicle (otherwise not illustrated) with the roof structure lowered.

In FIG. 2, the roof structure 10 is stowed away in the folding top compartment and the cover unit 5 is located in its closed position so that all the cover parts 6, 7, 8 serve to close the free space with an integrated shape. In the process, the lateral cover parts 8 and the rear cover part 7 are folded out.

In the position shown in FIG. 2, the front cover part 6 adjoins, with a front edge region 11, the rear edge region 3 of the rear region 4, as seen in FIG. 1. With a rear edge region 12, the front cover part 6 adjoins a front edge region 13 of the rear cover part 7. The rear cover part 7 for its part adjoins, with a rear edge region 14, the front edge region 2 of the folding top compartment lid 1. The lateral cover parts 8 adjoin both the front edge region 2 of the folding top compartment lid 1 and lateral edge regions 15 and 16 of the rear cover part 7 and of the front cover part 6. Moreover, the lateral cover parts 8 adjoin the rear edge region 3 of the rear region 4, as shown in FIG. 1.

In order to extend the roof structure into its closed position, the folding top compartment lid 1 is firstly folded up towards the rear, the lateral cover parts 8 remaining in their folded out active position. The roof structure 10 is then pivoted out of the folding top compartment in order to close off the interior of the vehicle which has been open until then. The adjusting movements of the front cover part 6 and of the rear cover part 7 are synchronized with the adjusting movement of the roof structure so that the front cover part 6 folds up towards the front at the right time and the rear cover part 7 folds away onto the underside of the front cover part 6. As a result of the vertical positioning of the front cover part 6 and as a result of the folding away of the rear cover part 7, a sufficiently large adjustment path for the roof structure 10 can be made available. When the roof structure 10 is closed, the front cover part 6 is then folded back again towards the rear and the bottom, but the rear cover part 7 remains on the underside of the front cover part 6, in its folded away position designated as the passive position. Before the folding back of the folding top compartment lid 1 towards the front and towards the bottom, the lateral cover parts 8 are folded away onto the underside of the folding top compartment lid 1, into their passive position.

FIG. 3 shows the state which is obtained when the roof structure 10 is closed, the free space is closed and the folding top compartment is closed. In this state, the front cover part 6 and the folding top compartment lid 1 are in the same closed position which they also assume in FIG. 2 when the roof structure 10 is lowered in order to close the free space and folding top compartment. However, in contrast to FIG. 2, in this state the rear cover part 7 is folded away onto the underside of the front cover part 6, and the lateral cover parts 8 are folded away onto the underside of the folding top compartment lid 1.

With the rear cover part 7 folded away into its passive position, a gap 17, which is penetrated by a lower and rear edge region (not illustrated) of the roof structure 10, is formed between the rear edge region 12 of the front cover part 6 and the front edge region 2 of the folding top compartment lid 1. The folded away lateral cover parts 8 leave behind in each case a passage opening 18 for one of the C pillars 9 of the closed roof structure 10 indicated by broken lines, between the front cover part and folding top compartment lid 1. When the roof structure 10 is closed, the folded away cover parts 7 and 8 are thus invisible, providing a particularly aesthetically pleasing vehicle interior. This is possible in particular by virtue of the fact that the dimensioning of the lateral cover flap 8 and of the rear cover flap 7 are selected such that when the roof structure 10 is closed the front cover part 6 adjoins, with its rear edge region 12, the lower, inner edge region of the closed roof structure 10 essentially seamlessly.

According to FIGS. 4 and 5, a lever arrangement 19, which is attached to the front cover part 6 directly or indirectly via a carrier plate 20 (indicated with interrupted lines) is provided in order to adjust the rear cover part 7. This lever arrangement 19 is embodied in such a way that linear adjustments, which act on it at the input end and are symbolized by a double arrow 21, are converted into pivoting adjustments of the rear cover part 7 about a pivot axis 22 which runs parallel to the front cover part 6. Here, the rear cover part 7 is mounted on the front cover part 6 by means of corresponding hinges 23. The lever arrangement 19 has a deflection lever 24 which is mounted on the front cover part 6 so as to be capable of pivoting about a pivot axis 25 which is positioned essentially perpendicularly on the front cover part 6 and is fixed in relation to the front cover part 6. A push-pull cable unit 27 acts on this deflection lever 24 at location 26 in order to apply linear adjustments to the deflection lever 24 according to a double arrow 21. Such a push-pull cable unit 27 is usually composed of a flexible cable 28 which is rigid under compression and tension and extends in a flexible sheath 29 which is rigid under compression and tension. This sheath 29 is secured to the front cover part 6 by means of a holder 30. The cable 28 has, at its end emerging axially from the sleeve 29, a rod element or tubular element 31 which is flexurally rigid and rigid under tension and compression and which acts in an articulated fashion on the deflection lever 24 at location 26 using a connecting element 32. At its other end (not shown), the push-pull cable unit 27 can be connected to a suitable external linear drive which is to be used to carry out the pivoting adjustment of the rear cover part 7. A preferred embodiment here is one in which the push-pull cable unit 27 is integrated into a positive control device (not shown) which is provided for the pivoting adjustment of the roof structure and is supported on the bodywork. The adjustment of the rear cover part 7 can be positively synchronized with the adjustment movement of the roof structure by means of a mechanical positive coupling between this positive control device and the push-pull cable unit 27, as a result of which continuously constant, synchronized kinematics are obtained for the rear cover part 7.

In addition, a coupling rod 33 acts on the deflection lever 24, which coupling rod is mounted at one end on the deflection lever 24 by means of a first ball-and-socket joint 34 and, at the other end, on a fitting element 36 by means of a second ball-and-socket joint 35, the fitting element 36 being mounted on the rear cover part 7. In the active position (shown in FIG. 4) of the rear cover part 7, the coupling rod 33 extends essentially flat along the underside of the front cover part 6, as a result of which a relatively flat overall design is obtained.

A guide link 37, into which the coupling rod 33 runs when the active position according to FIG. 4 is reached, is mounted on the front cover part 6 or on the carrier plate 20. This guide link 37 engages here over the coupling rod 33 transversely with respect to its longitudinal direction. This design forces the active position of the rear cover part 7 to be stabilized and forms a means of positively locking the rear cover part 7 which has been adjusted into its active position.

In addition, a spring element 39 which is embodied as a pneumatic spring acts in an articulated fashion on the deflection lever 24 at location 38. This pneumatic spring 39 is coupled at its other end, at location 40, to the front cover part 6 fixedly but capable of rotating about an axis which runs parallel to the pivot axis 25. The pneumatic spring 39 is positioned here and coupled to the deflection lever 24 in such a way that the pneumatic spring 39 prestresses the deflection lever 24, and thus the entire lever arrangement 19, into the position shown in FIG. 4 in which the rear cover part 7 assumes its folded-out active position.

It is of particular significance here that the deflection lever 24 assumes, in the active position of the rear cover part 7 shown in FIG. 4, a first over-center position in which the direction of the transmission of force of the coupling rod 33 in FIG. 4 passes the pivot axis 25 of the deflection lever 24 to the left. This means that in this first over-center position compressive forces applied to the deflection lever 24 via the coupling rod 33 drive the deflection lever 24 in the counter-clockwise direction, that is to say in a direction which counteracts the deactivation of the rear cover part 7. The result of this is that restoring forces acting on the rear cover part 7 cannot bring about any pivoting of the deflection lever 24. To this extent the active position is stable.

Furthermore, the deflection lever 24 has, in the passive position, as shown in FIG. 5, of the rear cover part 7, a second over-center position in which the direction of force of the pneumatic spring 39 according to FIG. 5 runs underneath the pivot axis 25 of the deflection lever 24. This means that, in this second over-center position, compressive forces (spring-restoring forces) applied to the deflection lever 24 via the pneumatic spring 39 drive the deflection lever 24 in the clockwise direction, that is to say in a direction which counteracts the activation of the rear cover part 7. This means that the pneumatic spring 42 secures the passive position.

The lever arrangement 19 according to the invention operates as follows:

In order to pivot the rear cover part 7 from the active position, shown in FIG. 4, into the passive position, shown in FIG. 5, a tensile adjustment is applied to the deflection lever 24 via the push-pull cable unit 27 at location 26, as a result of which the deflection lever 24 is driven in the clockwise direction. During the rotary adjustment of the deflection lever 24 in the clockwise direction, the pneumatic spring 39 is stressed counter to its spring force. In addition, in the process, the coupling rod 33 is moved out of the guide link 37 so that a tensile force is applied to the rear cover part 7 via the fitting element 36. As a result, a pivoting adjustment of the rear cover part 7 about its pivot axis 22 is positively brought about by the lever arms provided. In the course of this pivoting adjustment, the distance between the second ball-and-socket joint 35 and the front cover part 6 firstly increases and decreases again, the spatial inclination of the coupling rod 33 being correspondingly changed at the same time. In order to achieve the desired kinematics, the hinges 23 with which the rear cover part 7 is mounted on the front cover part 6 may be, for example, positioned in such a way that the pivot axis 22 which is defined in this way runs approximately between the ball-and-socket joints 34 and 35 of the coupling rod 33, when the rear cover part 7 is in its active position according to FIG. 4.

In FIG. 5, the rear cover part 7 has reached its passive position, i.e., the cover part 7 is folded onto the underside of the front cover part 6, a very flat arrangement being obtained overall as the undersides of the two cover parts 6 and 7 bear, as it were, one against the other, while their upper sides run essentially parallel with one another.

The second over-center position of the deflection lever 24, this position being assigned to the passive position of the rear cover part 7, has the effect that the relatively strong restoring force of the pneumatic spring 39 drives the deflection lever 24 further in the clockwise direction, that is to say in the deactivation direction of the rear cover part 7. In this way, the passive position of the rear cover part 7 is secured. In order to activate the rear cover part 7, corresponding compressive forces must be applied to the deflection lever 24 via the push-pull cable unit 27, these forces having to first overcome the restoring force of the pneumatic spring 39. However, after the second over-center position has been overcome, the restoring force of the pneumatic spring 39 supports the activation of the rear cover part 7.

In order to adjust the front cover part 6, it is possible to provide a pivot drive (not shown) with which the front cover part 6 can be pivotably adjusted in relation to the vehicle bodywork about an axis running parallel to the pivot axis 22.

This pivot drive is expediently integrated into the positive control device (already mentioned above) for adjusting the roof structure, in such a way that a mechanical positive coupling is formed between this positive control device and the pivot drive for the front cover part 6. In order to be able to achieve a sufficiently large pivoting adjustment of the front cover part 6, it may be necessary for the axis about which the front cover part 6 is pivoted to be arranged at a greater or lesser distance from the front cover part 6. In order to be able to ensure the actuator drive for the rear cover part 7 even with these relatively large adjustment paths, the push-pull cable unit 27 is of correspondingly flexible construction, which is implemented by means of the flexible cable 28 and the flexible sleeve 29. As already mentioned above, the other end, not shown in FIGS. 4 and 5, of the push-pull cable unit 27 is expediently also integrated into the aforesaid positive control device for adjusting the roof structure, in which case this can take place basically independently of the integration of the pivot drive for the front cover part 6. By means of the mechanical positive coupling of the drive means for the front cover part 6 and for the rear cover part 7 to the positive control device for the roof structure 10, the pivoting adjustments of the front cover part 6 and of the rear cover part 7 can be integrated in a suitable fashion into the course of the adjusting movements of the roof structure, this synchronization of the courses of movement being reproducible owing to the mechanical positive coupling for each adjustment procedure of the roof structure. This measure thus promotes the functional reliability of the entire course of movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cover device for a folding top compartment of a vehicle with a lowerable roof structure, the roof structure pivotable into the folding top compartment arranged behind a rear region in a back part of the vehicle's bodywork, the folding top compartment closable with a folding top compartment lid which is adapted to be folded up towards the rear region and a free space, which can be closed with a cover unit which has a front cover part and a rear cover part, remaining between a front edge region of the closed folding top compartment lid and a rear edge region of the rear region, wherein the rear cover part is mounted in a pivotably adjustable fashion on the front cover part and can be adjusted between an active position in which the rear cover part closes a gap between a rear edge region of the front cover part and the front edge region of the folding top compartment lid for a rear edge region of the roof structure, and a passive position in which the rear cover part clears the gap.

2. The cover device according to claim 1, wherein in the passive position the rear cover part is folded onto an underside of the front cover part.

3. The cover device according to claim 1, wherein in order to adjust the rear cover part, a lever arrangement, which converts input-end linear adjustments into pivoting adjustments of the rear cover part, is attached to the front cover part.

4. The cover device according to claim 3, wherein the lever arrangement has a deflection lever which is pivotably mounted about a pivot axis running essentially perpendicular to the front cover part and on which the linear adjustments act on a first end and on which a coupling rod is mounted at a second end by means of a first ball-and-socket joint, the coupling rod acting, at an end, directly or indirectly on the rear cover part by means of a second ball-and-socket joint, wherein a tensile adjustment which acts on the deflection lever applies a tensile adjustment to the rear cover part via the coupling rod, and wherein the tensile adjustment applied to the rear cover part folds the rear cover part away to an underside of the front cover part.

5. The cover device according to claim 4, wherein when the active position of the rear cover part is reached, the coupling rod runs between ends of the coupling rod into a guide link which engages laterally over the coupling rod between its ends, transversely with respect to a longitudinal direction of the coupling rod.

6. The cover device according to claim 4, wherein an axis of rotation, about which the rear cover part is mounted in a pivotably adjustable fashion by the front cover part, runs in a projection of the coupling rod onto a plane of the front cover part in the active position of the rear cover part between the first and second ball-and-socket joints of the coupling rod.

7. The cover device according to claim 4, wherein in the active position of the rear cover part, the deflection lever assumes a first over-center position in which a pressure force applied to the deflection lever via the coupling rod drives the deflection lever in a direction which counteracts a deactivation of the rear cover part.

8. The cover device according to claim 3, wherein the lever arrangement has spring means which counteract an adjustment of the rear cover part out of the active position into the passive position, and/or which support an adjustment of the rear cover part out of the passive position into the active position.

9. The cover device according to claim 8, wherein the spring means engage on the deflection lever.

10. The cover device according to claim 7, wherein in the passive position of the rear cover part, the deflection lever assumes a second over-center position in which a pressure force applied to the deflection lever via spring means drives the deflection lever in a direction which counteracts an activation of the rear cover part.

11. The cover device according to claim 3, wherein, via a flexible coupling element for transmitting linear adjustments, the lever arrangement is mechanically positively coupled to a positive control device, supported on the bodywork, in order to adjust the roof structure.

12. The cover device according to claim 11, wherein the coupling element is embodied as a push-pull cable unit.

13. The cover device according to claim 11, wherein a pivot drive, which is mechanically positively coupled to the positive control device of the roof structure independently of the lever arrangement, is provided for the front cover part.

14. A cover device for a folding top compartment of a vehicle with a lowerable roof structure and a folding top compartment lid, comprising:
    a front cover part; and
    a rear cover part;
    wherein the rear cover part is pivotably mounted on the front cover part and wherein the rear cover part is adjustable between an active position in which the rear cover part closes a gap between a rear edge region of the front cover part and a front edge region of the folding top compartment lid, and a passive position in which the rear cover part clears the gap.

15. The cover device according to claim 14, wherein in the passive position the rear cover part is folded onto an underside of the front cover part.

16. The cover device according to claim 14, further comprising a lever arrangement attached to the front and rear cover parts and wherein a linear force applied to a first end of the lever arrangement pivots the rear cover part at a second end of the lever arrangement.

17. The cover device according to claim 16, wherein the lever arrangement includes a deflection lever which is pivotably mounted about a pivot axis substantially perpendicular to the front cover part and a coupling rod which is mounted at a first end to the deflection lever and at a second end to the rear cover part.

18. The cover device according to claim 17, further comprising a guide link wherein the coupling rod is disposed within the guide link when the rear cover part is in the active position.

19. The cover device according to claim 17, wherein in the active position of the rear cover part, the deflection lever assumes a first over-center position in which a pressure force applied to the deflection lever via the coupling rod drives the deflection lever in a direction which counteracts a deactivation of the rear cover part.

20. The cover device according to claim 19, wherein in the passive position of the rear cover part, the deflection lever assumes a second over-center position in which a pressure force applied to the deflection lever via a spring drives the deflection lever in a direction which counteracts an activation of the rear cover part.

* * * * *